June 30, 1925.  
D. V. EDWARDS  
1,544,296  
CASING FOR ELECTRICAL APPARATUS  
Filed Dec. 29, 1922
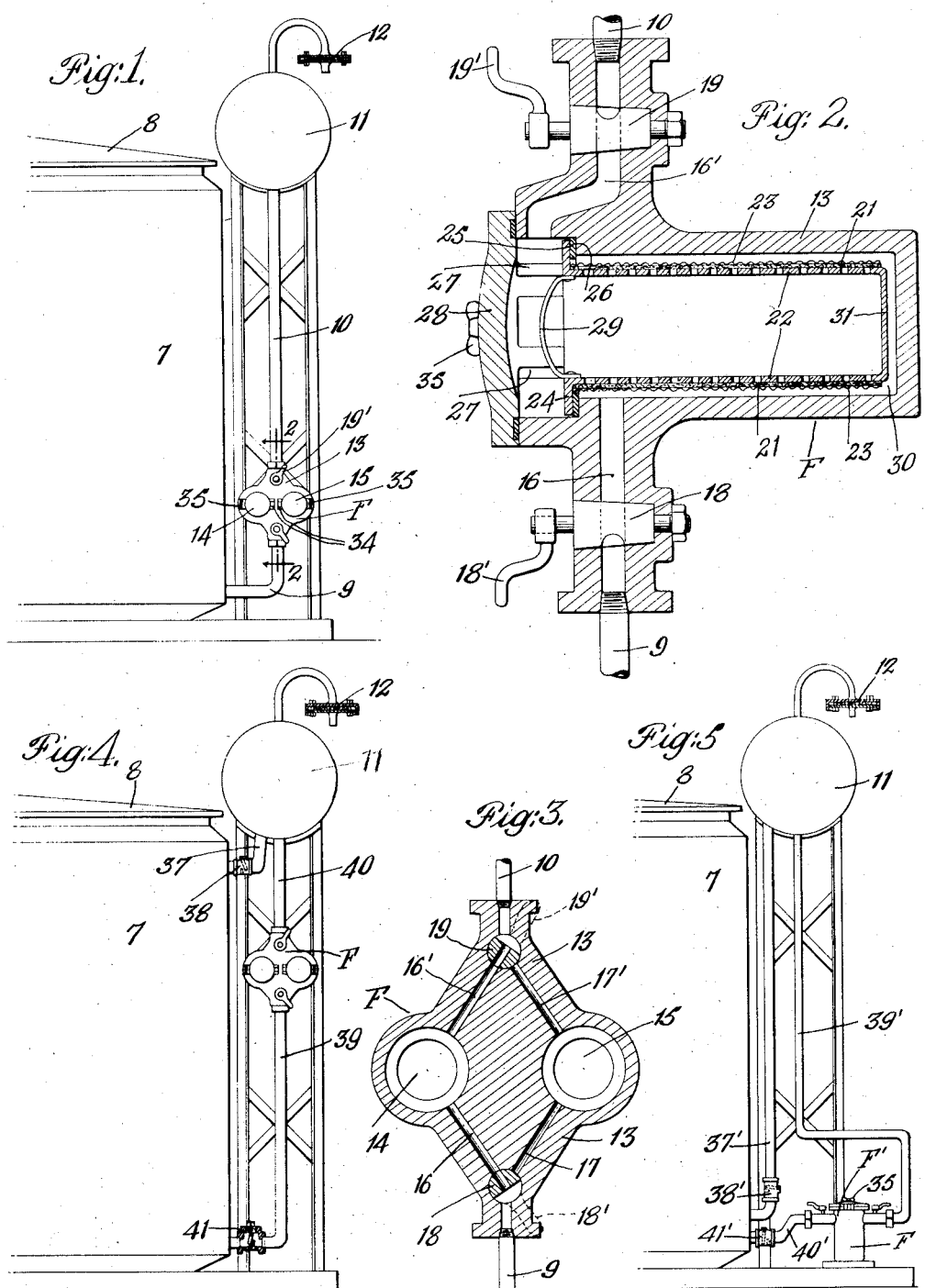

Patented June 30, 1925.

1,544,296

UNITED STATES PATENT OFFICE.

DONALD V. EDWARDS, OF TROY, NEW YORK, ASSIGNOR TO PITTSBURGH TRANSFORMER COMPANY, A CORPORATION OF PENNSYLVANIA.

CASING FOR ELECTRICAL APPARATUS.

Application filed December 29, 1922. Serial No. 609,568.

*To all whom it may concern:*

Be it known that I, DONALD V. EDWARDS, a citizen of United States, residing at Troy, in the county of Rensselaer and State of New York, have invented certain new and useful Improvements in Casings for Electrical Apparatus, of which the following is a specification.

This invention relates to containers for transformers or similar apparatus submerged in a cooling and insulating oil, and particularly to means for receiving the overflow of oil due to its expansion when heated by the transformer or other apparatus. In my copending application Serial No. 605,529, filed December 7, 1922, the means receiving the expanding oil is provided with a filter automatically cleansing the oil as it passes and before it returns to the tank.

The object of the present invention is to provide improved apparatus for receiving and filtering the oil, the filtering means and overflow tank being separate and most advantageously positioned with respect to each other and the main tank.

Other objects of the invention particularly in the provision of replaceable, alternatively operable filters will appear from the following specification taken in connection with the accompanying drawings in which Fig. 1 is an elevational view of a transformer tank provided with the expansion means of this invention, parts being shown broken away and in section.

Fig. 2 is a sectional view on a large scale of the filtering means taken on the line 2—2 of Fig. 1, Fig. 3 is another sectional view of the filtering means showing the relations of the circulating passages for the oil and Figs. 4 and 5 are views similar to Fig. 1 but illustrating modifications.

In the specific embodiment of the invention shown in Figs. 1 to 3 the main tank 7 containing the transformer or other apparatus in oil has a cover 8 tightly clamped in place and a pipe connection 9, 10 leads from tank 7 to an expansion tank 11 supported in elevated position by any suitable means. A breather 12 connects the top of the expansion tank to the atmosphere so as to maintain atmospheric pressure on the surface of the overflow. Between the pipes 9 and 10 is a filtering means F located in any convenient position and comprising a casing 13 having two separate filters 14 and 15 connected in parallel between the pipes 9 and 10 by passages 16, 16' and 17, 17' (Fig. 3), these passages being provided with valves 18, 19 adapted to connect pipes 9 and 10 through either filter while shutting off the other for inspection, removal or replacement. For instance, when handles 18', 19' of valves 18, 19 are turned toward filter 15 as shown in Fig. 1, this filter is shut off and the other filter 14 is connected in the line between the pipes 9 and 10 (see Fig. 3). Turning the handles 18', 19' toward filter 14 will shut off this filter and connect the filter 15 in the line between the pipes 9, 10. With one valve handle in one direction and the other in the other direction the connection between the pipes 9 and 10 is closed and with both handles vertical and pointing toward each other both the filters 14 and 15 are connected in parallel between the pipes 9 and 10.

With the valves 18 and 19 positioned as shown in Fig. 1 and the oil heating and expanding, oil will flow from tank 7 through pipe connection 9 and filter 14 and pipe 10 to tank 11. When the oil cools and contracts it will flow back from tank 11 through pipe 10, filter 14 and pipe 9 to the main tank 7. Thus the overflowing oil is filtered in both directions of flow.

In the specific form of filters 14, 15 shown in Figs. 1 to 3 the filtering material in each filter is in the form of a cylindrical sheet 21 wrapped around an inner perforated cage 22 and surrounded by an outer cylindrical screen 23, the whole filter being inserted in a well or chamber 30 in the casing 13. Each cage 22 is a separable body to permit the cage with the filter to be taken out and replaced, the cage comprising a flange 24 pressed against the gasket 25 on annular shoulder 26 by projections 27 on the clamping cover 28. Upon opening the cover 28 the cage and its filter may be removed, for instance, by the handle 29 of the cage. The oil from tank 7 passing through pipe 9 and passage 16 enters into the chamber 30 around the filter 21 and passes through the filtering material to the interior of the case, the innermost end 31 of the cage being solid without perforations. The oil then passes out of the cover end of the cage or filter support 22 and into the passage 16' leading to the pipe 10 which in turn leads to the expansion tank 11. Upon cooling and contraction of the oil in the main tank 7 this flow is reversed and must pass again in an opposite direction through filter or filters which are connected in circuit.

The filter material is preferably moisture absorbent and abstracts the moisture from the oil so that none of it is carried to the main tank 7 from the contact of the oil with the atmosphere in the expansion tank. The filters 14, 15 are easily inspected by opening the cover 28 hinged at 34 and tightly closed by the wing nut 35 at its outer end. While one filter is being inspected or removed and replaced the other may be kept in circuit so that there is no interruption of the connection between the main tank and the expansion tank. To avoid excessive accumulation of moisture or sludge on the filters these may be regularly inspected at definite intervals and the filtering material renewed if necessary. Instead of having this material in sheet form as shown at 21 a mass of filtering material may be packed in the inner portion of the cage 22, the volume of the packed material being much greater than that of the material in sheet form.

In the tank shown in Fig. 1 expansion pipe 9 is connected to the main tank 7 near the bottom so that the overflow is in and out from the bottom of the main tank the top of which is tightly sealed. This makes the expansion means independent of the tank cover 8 and avoids the return of any exposed oil to the top of the tank and also gives a long pipe connection 9, 10 between the main tank 7 and the expansion tank 11 so that the oil is thoroughly cooled by the time it is exposed to the air in the expansion tank.

In the modification shown in Fig. 4 the overflow pipe 37 leads to the expansion tank 11 from a point near the top of the main tank and is provided with a check valve 38 preventing the return of oil to the main tank through this outlet pipe 37. Return flow pipe connections 39, 40 are provided having a check valve 41 preventing the outflow of oil from the main tank through these return pipe connections. The filtering means F is interposed in return flow between the pipes 39 and 40 and is similar to the filtering means described in connection with Fig. 1, being positioned however at a somewhat higher elevation. In the expansion means of Fig. 4 the overflow passes into the tank 11 through pipe 37 and returns to the main tank through the pipes 39, 40 and filter F so that the oil is filtered only during its return from the expansion tank. The connections between the main tank and the expansion tank as shown in Fig. 4 are such as to create a continuous circulation of oil through these connections regardless of the expansion and contraction of the body of oil as a whole. The heated oil rises in the tank 7 and upward through the connection 37 and the oil which has become cool by radiation from the auxiliary tank 11 and the connections with the base of the tank 7, flows downwardly through these connections. This arrangement is advantageous in cold weather in that it furnishes a continuous supply of warm oil to the passages between the main and auxiliary tanks and thus prevents the oil becoming chilled to such an extent as to interfere with its movement through these passages.

In the expansion means shown in Fig. 5 the overflow pipe 37' with its check valve 38' is connected to the main tank near the bottom so that the overflowing oil leaves from the bottom of the tank and has a relatively long pipe to traverse before entering the expansion tank 11 and contacting with the atmosphere. In this modification the return piping 39', 40' has the filtering means F' interposed between pipes 39' and 40' and the filters F are positioned vertically instead of horizontally as in Figs. 1 and 4. With the horizontal arrangement of the filters there will be an outflow of oil from the filter chamber when the cover is opened, this outflow being caught in a pail by the attendant who is inspecting or changing the filters. Thus the attendant is compelled to completely empty the filter chamber at each inspection or renewal. With the vertical arrangement of the filtering means as shown at F' the covers may be opened and the filters removed and replaced without any overflow of the oil.

The oil expansion means of this invention having the filtering means separately connected between the expansion tank and the main tank permits the filters to be located at any desired position for convenience of access and without interference with any of the transformer parts. The overflow oil is automatically filtered and in order to remove the matter caught upon the filters it is only necessary for the attendant to renew the filters as often as required by the deposit upon them. The filter will be of such size as to require inspection or renewal only at desired long intervals and these will depend upon the size of the main transformer tank, the service to which the apparatus is put and the locality in which it is situated. Instead of having a cage such as 22 carrying replaceable filtering material it may in some cases be preferable to have the removable part itself formed of a filtering material; for instance in the apparatus shown the filter might be a cylinder closed at its inner end and flanged at its outer end to be substituted in place of the cage 22. Also, if desired, the outer end of the casing 13 may be inclined downward or otherwise provided with a portion for collecting water, and a drain cock connected with such portion of the casing in order to draw off water prevented from passing the screen.

I claim:—

1. The combination with a main tank containing oil, of an expansion tank communicating therewith, and a plurality of separate filters interposed between the main tank and the expansion tank, and valve means directing the oil through either of said filters.

2. The combination with a main tank containing oil, of an expansion tank communicating therewith, and a plurality of separate filters interposed between the main tank and the expansion tank, and valve means directing the oil through both of said filters.

3. The combination with a main tank containing oil, of an expansion tank in communication therewith, and separate filtering means between said tanks comprising a filter chamber connected to said tanks, a filter in said chamber, and means for removing the filter without disturbing the connections between said chamber and tanks.

4. The combination with a main tank containing oil, of an expansion tank in communication therewith and separate filtering means between said tanks comprising a filter chamber and a removable filter therein including a detachable holder and filtering material carried thereby.

5. The combination with a main tank containing oil, of an expansion tank in communication therewith and supported adjacent the top of said main tank, filtering means between said expansion tank and said main tank and below the level of said expansion tank and means to permit access to said filter while permitting flow between said tanks.

6. The combination with a main tank containing oil, of an expansion tank in communication therewith and supported adjacent the top of said main tank, and filtering means between said expansion tank and said main tank and below the level of said expansion tank, said filtering means comprising a filter which is removable and replaceable without disconnecting the remainder of said filtering means.

7. The combination with a main tank containing oil, of an expansion tank communicating therewith and with the atmosphere, and a separate moisture filter device interposed between said tanks, the filter being so formed as to permit sufficient flow of oil therethrough to compensate for the contraction of the oil in the main tank.

8. The combination with an oil tank and an oil circulating system in communication therewith, a filter interposed in the path of oil through said system, said filter being accessible without interfering with the passage of oil through said system.

9. The combination with an oil tank, an oil circulating system in connection therewith comprising an expansion tank, a filter interposed in the path of oil through said system between said tanks, said filter being accessible without interfering with the passage of oil through said system.

10. The combination of a tank, an oil circulating system, a removable filter in the path of oil through said system and a manually controlled bypass around said filter.

11. The combination with a tank, an oil circulating system in connection with said tank, said system comprising means to collect foreign material in said oil comprising a chamber accessible from the outside in which said foreign material is collected and a controllable bypass around said chamber.

12. The combination of a tank adapted to contain oil, a circulating system for said oil, two filters in the path of oil through said system and means for preventing passage of oil through either or both of said filters.

13. The combination of a tank adapted to contain oil, a circulating system for said oil, two filters in the path of oil through said system and means for permitting passage of oil through either or both of said filters.

14. The combination with a tank adapted to contain oil, a circulating system for said oil, a filter in the path of oil through said system and means for removing said filter without loss of oil from said system.

15. The combination with means forming a chamber adapted to contain a transformer and oil and means forming an expansion chamber for said oil, communicating means between said chambers adapted to receive oil from the upper portion of said first named chamber and to discharge oil into the lower portion of said first named chamber, and oil purifying means in the path of oil external to said first named chamber.

16. The combination with a transformer tank adapted to contain oil, a circulating system adapted to receive oil from the upper portion of said tank and deliver the same to the lower portion of said tank and oil purifying means in said system.

17. The combination with a main tank containing oil, an oil expansion tank, and means permitting oil to pass from the upper part of the main tank to the expansion tank and from the expansion tank to the lower part of the main tank.

18. The combination with a main tank adapted to contain oil, an oil expansion tank communicating with the interior of said main tank at the top thereof and at the bottom thereof whereby a continuous circulation of oil is maintained between said tanks.

19. The combination of means forming a chamber adapted to contain a transformer and oil, and means forming an expansion chamber for said oil, a pipe adapted to receive oil from the upper portion of said first named chamber and to discharge oil into the said second named chamber, a pipe adapted to receive oil from said second named chamber and to discharge oil into the lower portion of said first named chamber, and a check valve in one of said pipes.

DONALD V. EDWARDS.